(12) United States Patent
Phillips

(10) Patent No.: US 9,274,742 B2
(45) Date of Patent: Mar. 1, 2016

(54) VISUAL-SYMBOLIC CONTROL OF REMOTE DEVICES HAVING DISPLAY-BASED USER INTERFACES

(71) Applicant: PixiOnCloud, Inc., Menlo Park, CA (US)

(72) Inventor: Graham Peter Phillips, San Jose, CA (US)

(73) Assignee: PixiOnCloud, Inc., Menlo Park, CA (US)

( * ) Notice: Subject to any disclaimer, the term of this patent is extended or adjusted under 35 U.S.C. 154(b) by 548 days.

(21) Appl. No.: 13/661,007

(22) Filed: Oct. 25, 2012

(65) Prior Publication Data

US 2014/0118239 A1   May 1, 2014

(51) Int. Cl.
| | | |
|---|---|---|
| G09G 5/00 | (2006.01) | |
| G06F 3/14 | (2006.01) | |
| G06F 9/44 | (2006.01) | |
| G06F 9/455 | (2006.01) | |

(52) U.S. Cl.
CPC ............ *G06F 3/1454* (2013.01); *G06F 9/4445* (2013.01); *G06F 2009/45575* (2013.01); *G09G 2370/04* (2013.01)

(58) Field of Classification Search
CPC ..... G06T 11/001; G06T 15/04; G06T 15/005; G06F 9/44458; G09G 5/363
See application file for complete search history.

(56) References Cited

U.S. PATENT DOCUMENTS

| | | | |
|---|---|---|---|
| 5,325,377 A | 6/1994 | Tuttle | |
| 6,304,895 B1 | 10/2001 | Schneider et al. | |
| 7,432,876 B2 * | 10/2008 | Okuley | 345/1.1 |
| 7,870,504 B1 | 1/2011 | Mcintosh et al. | |
| 8,803,811 B2 * | 8/2014 | Kondo et al. | 345/169 |
| 2005/0037815 A1 * | 2/2005 | Besharat et al. | 455/566 |
| 2008/0016491 A1 | 1/2008 | Doepke | |
| 2008/0055191 A1 * | 3/2008 | Craig et al. | 345/2.2 |
| 2009/0322674 A1 | 12/2009 | Fujita et al. | |
| 2010/0138780 A1 * | 6/2010 | Marano et al. | 715/804 |
| 2010/0306667 A1 * | 12/2010 | Umeo et al. | 715/740 |
| 2012/0117198 A1 | 5/2012 | Bolduc et al. | |
| 2013/0080898 A1 * | 3/2013 | Lavian et al. | 715/728 |
| 2013/0147832 A1 * | 6/2013 | Patel | 345/619 |
| 2014/0085166 A1 * | 3/2014 | Hutchinson et al. | 345/2.2 |

OTHER PUBLICATIONS

Hocke, Raimund et al., "Region—Sikuli X 1.0 documentation," Project Sikuli, 2010, available at <http://sikuli.org/docx/region.html>.

\* cited by examiner

*Primary Examiner* — Todd Buttram
(74) *Attorney, Agent, or Firm* — Proxigee Legal Transactions; Elizabeth Anne Nevis, Esq.

(57) ABSTRACT

Traditional, programmatic automated remote control of computerized devices requires extensive tailoring for each device type and operating system. A visual-symbolic control method enables largely device-agnostic control of any target device with access to display and a means of user input (keyboard, mouse, touchpad, touch-screen, etc). An image-processing daemon analyzes the displayed image and recognizes its component visual entities (windows, icons, buttons, etc.), creates symbolic entities from extracted attributes of the visual entities, and organizes the symbolic entities into a symbolic object model instance. The functional relationships and hierarchies of the visual entities are captured in the arrangement of symbolic entities in the symbolic object model instance. Visual-symbolic control commands act on the symbolic entities, and, where appropriate, the commands are transmitted to the target device as user-like target-input.

16 Claims, 10 Drawing Sheets

VISUAL-SYMBOLIC CONTROL OF REMOTE DEVICES HAVING DISPLAY-BASED USER INTERFACES

RELATED APPLICATIONS none

FEDERALLY SPONSORED RESEARCH AND DEVELOPMENT none

APPENDICES (1) Examples of symbolic entity types, (2) examples of commands, (3) sample script, and (4) part of symbolic object model were submitted in text form via EFS-Web and are incorporated herein by reference.

BACKGROUND

Related fields include electronic digital data processing and, in particular, control of a slave computer by a master computer, remote data access, and remote detection and correction of software faults.

Occasions to control one microprocessor-containing device from another are plentiful and increasing. Enterprise information technology (IT) groups in any industry can greatly increase their efficiency and reduce their companies' overhead if they can install, update, and troubleshoot software on servers without needing to physically visit each server. Technical support for field-installed software and hardware becomes more cost-effective when problems can be diagnosed and fixed remotely, computer-to-computer. Insufficient network connectivity is no longer a primary obstacle to efficient control of remote devices, because both public and private networks have become increasingly ubiquitous, especially in urban areas. Instead, the diversity of operating systems and device technology has become a dominant obstacle.

One approach to the device-diversity problem is to provide some mechanism to configure the remote devices. Such mechanisms have included standardized network protocols such as NETCONF®, software development kits for the various platforms such as Amazon's AWS SDK®, and graphical desktop-sharing systems such as VNC® that enable control of a computer with one OS by another computer with a different OS. Enterprise IT departments typically exercise central control over remote devices through platform-specific application programming interfaces (APIs) provided by the device vendors. Each new device platform, needing to be addressed through its own API, adds cost to the central management system. As new devices and platforms enter the market at an increasing rate, the problem becomes exacerbated. Because of the labor and risk involved in adding another platform that IT will need to support, many enterprises are reluctant to adopt new devices or programs that could potentially boost productivity, Instead, they strive to limit the diversity of hardware and software in use.

Software bugs cost the U.S. economy $60 billion per year, according to a 2003 study by the U.S. National Institute of Standards and Technology (NIST), despite software companies' typically allocating 50% of development costs to testing. The most common approach to software testing is to run a large number of focused test cases. These test cases could be executed faster and more consistently, and cover more of the program under test, if they were automated. Often, however, the automation itself takes a prohibitively long time; time to create tests that thoroughly cover the scope of operation, and time to maintain the tests as new versions of the software are created.

As diverse as the underlying programs for different device operating systems may be, the graphical user interfaces (GUIs) have been converging on at least some degree of similarity. Manufacturers have found that many customers are more willing to use a new device if the interface looks and feels at least somewhat familiar. Among computers, and increasingly among smaller devices their processors and screens have become able to support it, the "desktop" GUI has gained wide acceptance. The device's display simulates the surface of a desk with various objects on it: folders, books, calendars, clocks, and graphic icons identifying programs, functions, or peripheral devices such as connected printers. By entering an input (typing, clicking touching, gesturing, speaking, etc.) directed at one of these objects, a "folder" can be opened to show its contents; an appointment can be entered on the "calendar"; a calculation can be done on the "calculator"; a program can be started by selecting its icon, and so on. Among simpler devices such as microprocessor-enhanced household or public appliances, "control-board" GUIs are still seen; the user "presses" text-labeled or pictorial buttons to perform an action or expose a new selection of options. In some cases, simple text or numeric values can be entered. As the GUI interface becomes more ubiquitous, software manufactures take pains to ensure that their new devices support a GUI, and further that the GUI is not too dissimilar from established GUIs, so that users adopt the new devices easily.

This increasing ubiquity of the GUI as the device interface offers an opportunity for controlling remote devices without the costly traditional API programming approach by interacting with devices the way a human user would: analyzing the on-screen display and interacting with the visual entities shown. If the complexity and consequent slowness of analyzing and manipulating the image data could be overcome, automated operations such as control of remote devices and software testing could be carried out on multiple platforms with identical, or nearly identical, scripts. Therefore, a need exists to interact with different display-based user interfaces (graphic user interfaces, text "console" interfaces, etc.) in a unified way, largely agnostic to the operating system or other programmatic nuances of the target device being controlled.

SUMMARY

Visual-symbolic control (VSC) software enables a controlling device to automatically and remotely control virtually any type of target device, as long as the target device has a readable display that changes in response to user input actions (e.g. a monitor screen) and some way to receive user input actions (e.g. a keyboard, mouse, touch-screen, touch-pad, or microphone for spoken command input). The software analyzes the readable display, renders its displayed components as data structures, performs actions on the data structures, and transforms the actions into user-like target input (e.g. keystrokes for target devices with keyboards, mouse-clicks for target devices with mice, etc.). Security measures on the target device designed to exclude unauthorized users, however, will exclude the software's "user-like" scripted interactions to the same extent. For example, remote access to a password-protected file via visual-symbolic control still requires the correct password.

The data-intensive displayed image (e.g. desktop) is quickly dissected into its component visual entities (VEs); windows, icons, buttons, and the like. Compact, abstract symbolic entities (data structures) are generated from the visual entities. The symbolic entities (SEs) are organized into a symbolic object model instance that reflects the relationships, connections, and hierarchies of the corresponding VEs on the display. All the software's interactions with the target device manipulate this compact symbolic object model instance (SOM-I), rather than the much larger displayed image or compressions or sections thereof.

VSC is adaptable to a broad range of devices and tasks. Some embodiments are equipped to disambiguate the complex and sometimes confusing images that can appear on the displays of systems designed for multi-tasking. Some embodiments need no special hardware or software on the target device. Target devices can include tablets, smartphones, vehicle and kiosk displays, and display-equipped appliances and machines as well as desktop and laptop computers.

VSC facilitates efficient management of distributed systems. One controlling device can execute tasks on multiple target devices, in some cases simultaneously. The software can act on a target device's virtual and remote desktops in the same manner as on its primary desktop. The software can control a target device whose operating system is not running, as long as the bootloader, diagnostic, or other underlying utility responds to target-input and the response is expressed through the readable display. A new device introduced in the distributed system can be handled with simple edits to existing scripts, or sometimes with unaltered existing scripts, rather than rebuilding and re-testing an entire management layer.

VSC reduces the time and expense required for software testing. Scripts for the same tasks on different operating systems can be very similar or even identical, depending on the similarities between the user interfaces. Results of GUI actions can be verified via text-based actions on back-end databases.

The visual-symbolic control software includes an application programming interface (API) that enables a wide range of control tasks to be automated easily. Scripts can be written to "learn" a new target device with little or no prior knowledge of its operating system. A single script can be used to perform the same task on target devices with different operating systems, as long as the user inputs and displayed reactions to those inputs are sufficiently similar (e.g., double-clicking a program icon starts running the program on a variety of different computer operating systems, and the icon for a given program has the same appearance for any operating-system version). Alternatively, scripts can recognize a target device's OS from cues in the readable display, then access stored OS profiles to immediately choose the correct target-input (e.g., clicking the "x" button to close a window on a PC or the "red light" button to close a window on a Mac). These scripts can run faster and perform a wider variety of functions than visual processors that do not operate in a symbolic domain.

In some scripting embodiments, visual-symbolic control commands can be embedded in a variety of existing scripting languages, or written as a series of naturalistic text commands to be interpreted or compiled. The API is easy to adopt because its abstraction level is not based on esoteric concepts in the underlying code, understood only by programmers fluent in that particular code. Rather, the abstraction level is based on visual entities appearing in the displayed image.

Other ways to use the visual-symbolic control software, besides embodiments of the API, include graphical user interfaces, HTTP and other transfer protocols, NETCONF and other network-management protocols, ReST and other networked-application design architectures, infrared remote controls, motion-captured gestures, or voice commands. These interaction modes also benefit from ease of adoption because the visually-based abstraction is easier for many new users to grasp than many forms of programmatically-based abstraction.

DETAILED DESCRIPTION

Figure 1:
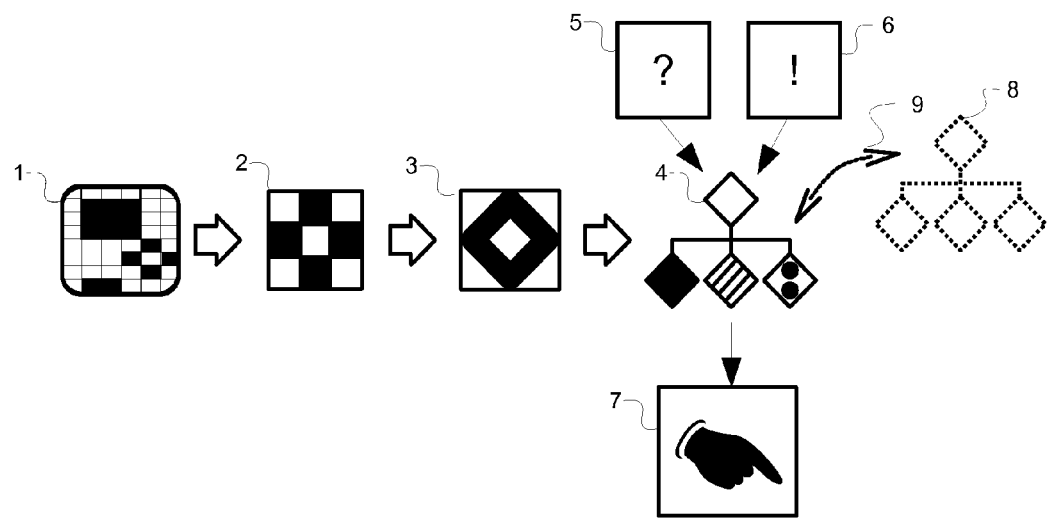
FIG. 1 illustrates some basic concepts common to many embodiments.

This Description presents some definitions of terms as used in this document, provides an overview of some central concepts, describes some simple embodiments in more depth, provides a step-by-step example of a scripted process, and discusses examples of alternate and enhanced embodiments. The Appendix includes samples of symbolic-entity types, scripting commands, a script for the example process, and part of a symbolic object model.

DEFINITIONS

As used herein,

"Controlling device" means the computer or other device from which VSC action is initiated by a user. For scripted actions, the script may or may not have been composed on the controlling device, and may or may not be stored on the controlling device or run on the controlling device (i.e., a controlling device may access a development environment, editor, or runtime remotely over a network).

"Framebuffer" means a portion of target-device memory reserved for holding the complete displayed image. On many devices, a video output or similar port allows access to the content of the framebuffer.

"Hover-text" means text that appears when a cursor hovers over a displayed visual entity such as an icon or button. Usually, hover-text includes information on what the visual entity is or does. Typically, hover-text disappears when the cursor moves away.

"Label text" is text associated with a visual entity that is visible whenever the associated visual entity is visible (though it may be obscured by another visual entity "in front" of it).

"Mouse" includes optical and mechanical computer mice, and any other input device or group of devices that can move a cursor around a display screen in a continuous path at an arbitrary angle and manipulate visual entities (select, move, deselect, re-size, etc.) Non-limiting examples include touch-pads, touch-screens, trackballs, joysticks, track-pads, and game gloves.

"Target adaptor" means the functions of (1) capturing a displayed image from a target device for processing and (2) translating commands for "user-like" target-input (keystrokes, clicks, touches, etc.) into signals understood by the target device.

"Target device" means a device that is controlled by VSC. At a minimum, a target device needs a visible display of some aspect of system status (or something that could be captured as a visible display, e.g. a spatially varying tactile or thermal output) and a way for a user to interact with the device and change the displayed aspect (e.g. a keyboard, mouse, button(s), touch-screen, gesture scanner, speech analyzer, biofeedback sensor, or the like).

"Target-input" means the type of signal that acts on the target device when a user interacts with it (e.g., the signals corresponding to keystrokes, mouse-clicks, button-pushes, etc.).

"Widget" means, generically, a feature displayed by the target device that can be affected directly or indirectly by target-input.

"Window" means, generically, a widget that can be caused by particular target-input to "open" and reveal additional widgets or other contents, or "close" and relinquish space on the target device's display. Some types of window may also be moved or resized, or their contents may be moved within the window, for example by scrolling. In particular, the meaning extends to widgets with this type of behavior on any operating system, including but not limited to Microsoft Windows®.

Overview and Introductory Embodiments:

VSC scripts can automate a wide variety of tasks. Script functionalities include, without limitation, opening application by name (e.g. "open Firefox"); moving a cursor to a particular visual entity (e.g., "go to first text-entry field of in-focus window" or "go to 'My Account' menu); jumping to the "next" or "previous" text-entry field; selecting (e.g. left-click, right-click, double-click, key-shortcut) a particular visual entity; typing characters; selecting or clearing text where the text-selection "caret" is located. Program, browser, or "console" (command-shell) windows can be opened, moved, maximized, or minimized, and have text typed into and read from them. Visual entities within a window can be searched for, scrolled through, selected, typed into, and otherwise manipulated. The scripts are resilient to variable response times on the target devices, which is a common challenge in automating tasks; the scripts can wait an allotted time for one or more visual entities to appear, signifying that the target device is ready for the next command.

FIG. 1 illustrates some basic concepts common to many embodiments. A displayed image 1 is dissected into its component visual entities (VEs) 2. VEs 2 may be interactive GUI objects such as windows, icons, or buttons, but they also may be passive elements such as background "wallpaper." If the VE 2 is recognized as belonging to a predetermined set of VE types, a corresponding symbolic entity (SE) 3 is created and given a place in a symbolic object model instance (SOM-I) 4. Connected to, and informing, SOM-I 4 is symbolic object model (SOM) 8.

SOM 8 includes knowledge about the display domain, such as fonts and the appearances of common VEs 3 such as windows and taskbars. SOM 8 may include image libraries for recognizing, and instantly creating the correct SEs for, particular VEs such as application icons. SOM 8 may also include mapping structures relating the alternate appearances of polymorphous VEs, such as cursors that change shape depending on their proximity to other VEs such as resizing handles. This mapping structure enables the SOM-I to preserve an SE, albeit with changed attributes, when the corresponding polymorphous VE changes its appearance. This is a situation in which many other display-analysis algorithms often encounter problems: If a VE changes its appearance, the tendency is for the software to erroneously determine that the VE it was tracking has disappeared and a new one has appeared. The domain knowledge in the SOM may be organized by operating system (OS), by display type or device type, or any other logical taxonomy. Tagging or other labeling strategies may enable the SOM to be reorganized to suit a particular situation.

The communication path 9 between the SOM and SOM-I is shown as a double-headed arrow because, in many embodiments, the information flows both ways. Domain knowledge flows from the SOM to the SOM-I, populating the SOM-I with SEs corresponding to recognized VEs. If an unfamiliar VE is detected in the displayed image, some embodiments include training modes or training sequences for capturing the appearance and behavior of the new VE and cataloguing it as part of the domain knowledge of the SOM. New VEs and other domain knowledge may also be added to the SOM manually.

Each SE 3 in SOM-I 4 contains information about the attributes and relationships of the corresponding VE 2. However, where a VE 2 is typically a fairly large block of data (for instance, hundreds of pixels, each with a red, blue, and green level), an SE 3 is a far smaller and simpler data structure that can be processed much faster and stored in far less space. In some embodiments, an SE 3 may be expressed as a textual list of identifiers, attributes, and relationships. In embodiments of the runtime, queries 5 and commands 6 are addressed directly to SOM-I 4 and its component SEs 2. The structure of SOM-I 4 adds functionality that would not be possible with an unstructured collection of entities. For example, if an application icon appears on a desktop, and a picture of the same icon is visible in a browser or document window, the SOM-I "knows" which one will open the application when clicked (the one directly subordinate to the desktop).

Some of the commands 6 are translated into target-input 10, i.e. signals that the target device understands as user input such as keystrokes and mouse motions. This allows the VSC software, like a user, to explore and manipulate functions of the target device without needing to know any programmatic details of the underlying code. Because of the efficiency of accessing information, making decisions, and executing commands in the SE space, however, these processes can take place very quickly. In many cases, scripts for diagnostics and maintenance can run on alternate desktops of target devices that are in use, without disrupting human users' simultaneous use of the devices.

Figure 2:
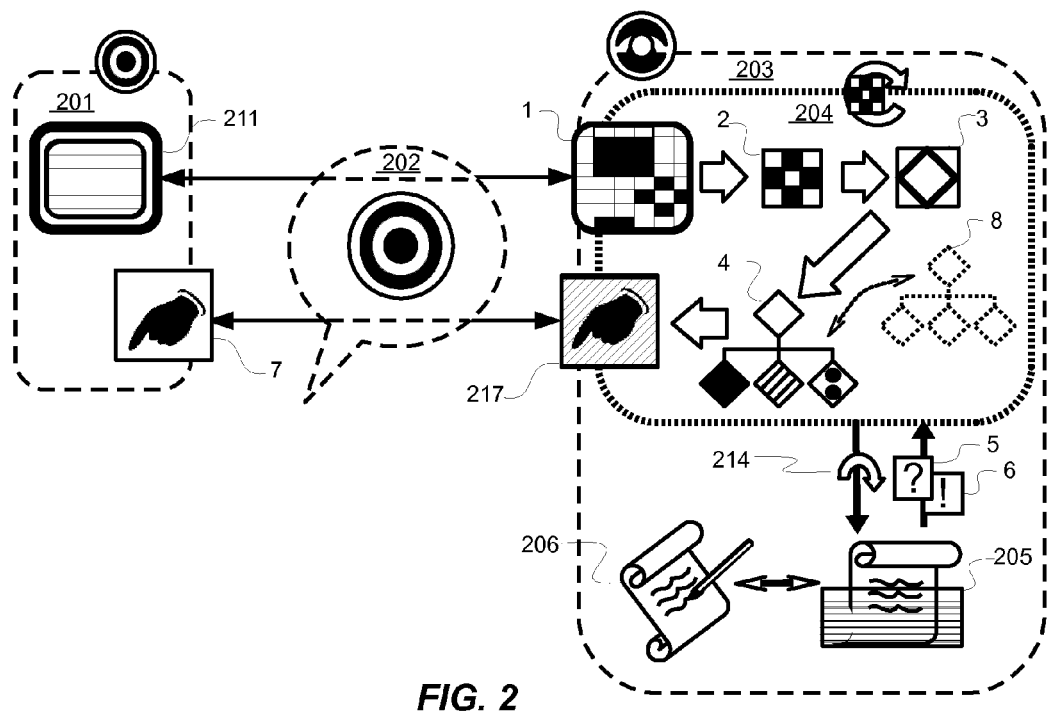
FIG. 2 is a block diagram of one possible distribution of functions between a controlling device and a target device in some embodiments.

FIG. 2 is a block diagram of one possible distribution of functions between a controlling device and a target device in one embodiment. Target device 201 holds at least one current frame of its display in framebuffer 211. The content in framebuffer 211 is accessed (e.g. through a video port) and converted in target adaptor 202 to displayed image 1. Displayed image 1 is transmitted to image-processing daemon (IPD) 204, which is shown here running on controlling device 203. IPD 204 extracts VEs 2 from displayed image 1, generates corresponding SEs 3, and organizes SEs 3 into SOM-I 4 using the domain knowledge and structures from SOM 8. In preferred embodiments, SOM 8 and SOM-I 4 are written to a type of memory that persists if the IPD is paused, stopped, or restarted, and even if the power fails or is otherwise shut off.

Periodically, or when triggered by a change in displayed image 1, IPD 204 sends SOM-I update information 214 to script interpreter 205. As a script or other sequence runs, script interpreter 205 sends queries 5 and commands 6 to IPD 203. If a command 6 calls for a target-input action, IPD 204 transmits target-input indicator 217 to target adaptor 202. Target adaptor 202 converts target-input indicator 217 to target device 201's native target-input 10 and transmits target-input 10 to target device 201 such that target device 201 perceives native target-input 10 as a user input.

Script development environment 206 on controlling device 203 allows a user to develop new scripts. In adaptive embodiments, script interpreter 205 can interact with script development environment 206 to "learn" about the target device and refine scripts automatically. To operate VSC, a controlling device needs (a) a way for the programmer to write and edit scripts, (b) an interface for loading the scripts, (c) a mechanism for running the scripts (e.g. an interpreter or compiler and a runtime environment), and (d) a way to capture and log the results. Some preferred embodiments also include (e) a way to build higher-level functionality by combining scripts, and (f) in the context of an enterprise device-management system, integration points with other relevant management systems such as customer, inventory, order, and fault management systems. In some embodiments, a single controlling device may manage thousands of target devices, for instance by routing the data-intensive image-processing tasks to specialized hardware or multiple CPUs.

Distributed computing allows for many variations on where the various processes take place. Target adaptor 202 as shown in this conceptual diagram is an abstraction of the set of target-adaptor functions. These functions can be performed alternatively by hardware, software, or a combination of both, which can be located on the target device, the controlling device, or somewhere on a network connecting the two. Likewise, IPD 204 may be distributed in a number of ways between the controlling device and the target adaptor, target device, and intermediate resources on the network. Script development environment 206 may partially reside on a network connected to the controlling device (for instance, a mobile computer the programmer can use offsite) instead of on the controlling device itself. Distributed versions are discussed in more detail in a later section.

Figure 3A:
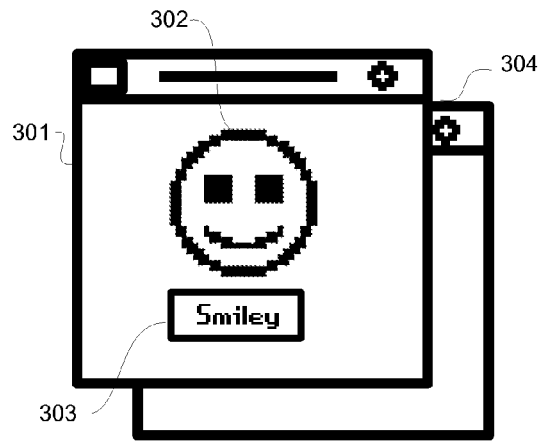
FIGS. 3A-3E illustrate an embodiment of extracting a visual entity from a displayed image and generating a corresponding symbolic entity.

FIGS. 3A-3E illustrate an embodiment of the IPD process of recognizing VEs in a displayed image and generating SEs for those VEs identified as belonging to a predetermined set. FIG. 3A shows part of a pixel-based displayed image, including focus window 301, an icon 302 and its associated label 303 inside focus window 301, and a non-focus window 304 partially visible behind focus window 301.

Figure 3B:
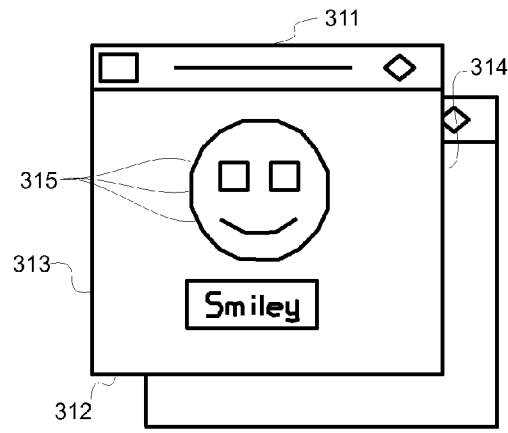

In FIG. 3B, the IPD has detected the edges in the displayed image of FIG. 3A by a suitable edge-detection algorithm, which may include binarizing the image. Each pixel (or other minimum unit of display-image area) is now identified as either an "edge" point or a "non-edge" point. The IPD then organizes all the edge points into geometric borders. In this example, the geometric borders are straight lines, which are efficient for window and panel outlines such as side borders 311, 312, 313, and 314 of focus window 301. Curved lines such as the outer perimeter of circular icon 302 are fit with a series of straight lines 315. In other embodiments, the geometric borders fit to curved lines may be equations describing arcs of circles or ellipses, sinusoids, polynomials, or other suitable expressions.

In additional embodiments, the geometric borders are arbitrary contours formed from any chain of edge points in contact with each other, regardless of the shape of the chain. In further embodiments, icon 302 and other graphically complex widgets are selectively processed by a method including capture of its image; selective processing will be further discussed in a later section. In some embodiments, each VE type is extracted by an algorithm tailored to quickly and accurately recognize the particular type and extract its attributes. Many embodiments include a disambiguation process (discussed further in a later section) for situations where multiple VEs are juxtaposed such that their relationship is unclear.

Already, the extracted geometric borders are much more compact than even a compressed version of the displayed-image bitmap. In some embodiments, the IPD stores the geometric borders or their attributes in persistent memory for use in debugging or adaptive processing. A next step may be to recognize instances where the extracted geometric borders define geometric shapes.

Figure 3C:
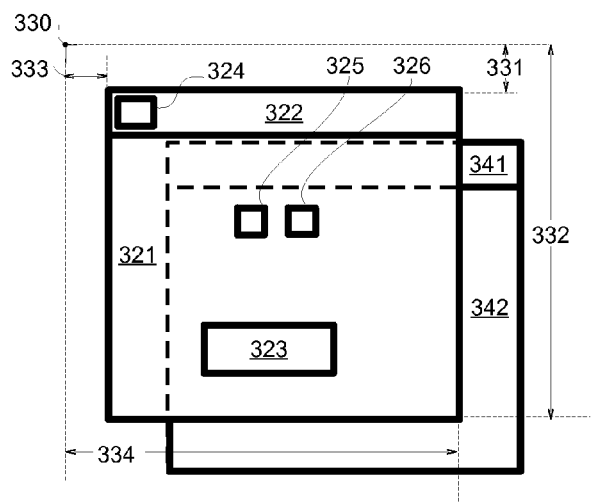

In FIG. 3C, some geometric borders from FIG. 3B are recognized as forming rectangular geometric shapes. This approach is efficient for rectangle-dominated displays such as window-based desktops, but other geometric shapes may also be detected. Pairs of parallel lines that visibly intersect at 90° are identified as rectangles 321, 322, 323, 324, 325, and 326. In addition, partially hidden rectangles 341 and 342 are extrapolated from their visible portions. Some of the detected rectangles, such as the eyes 325 and 326 of Smiley icon 302, may be discarded as too small to be independent VEs. In some embodiments, the IPD stores the geometric borders or their attributes in persistent memory for use in debugging or adaptive processing.

One scenario benefiting from storage of intermediate entities such as geometric borders and geometric shapes is when some edge points are missing, extra, or ambiguous. This can occur, for example, where the background is highly patterned (extra edges that belong to the background image rather than any separate VE) or where a VE is nearly the same color as whatever is behind it (gaps where part of the VE outline is not detected as an edge). The IPD can iterate the edge detection at higher and lower thresholds and evaluate the resulting changes in the extracted geometric borders and geometric shapes.

The IPD then calculates a minimal-size untilted bounding box for each geometric shape. In this example, both the position and the size of the bounding box of rectangle 321 are captured by four values representing horizontal or vertical distances from a reference point 330: vertical distance 331 from reference point 330 to the uppermost edge of rectangle 321, vertical distance 332 from reference point 330 to the lowermost edge of rectangle 321, horizontal distance 333 from reference point 330 to the leftmost edge of rectangle 321, and horizontal distance 334 from reference point 330 to the rightmost edge of rectangle 321. A convention in computer graphics libraries uses the top left corner of the screen as the reference point 330, and measures all distances from there in pixels. However, any other choice of reference point and measurement units, and any other way of expressing the position and size of the bounding box, and even the use of non-rectangular bounding shapes, could be used in different embodiments.

Figure 3D:
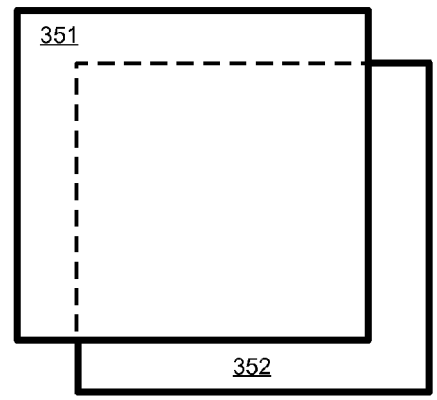

Once all the geometric shapes have bounding boxes, the IPD uses the domain knowledge in the SOM to determine which geometric shapes or associated sets of geometric shapes correspond to VE types in a predetermined set, and derive correct SE types for those VEs. Here, the predetermined set includes at least a "window" VE type and an "icon" VE type. In FIG. 3D, two of the rectangles from FIG. 3C are identified as windows 351 and 352. Various criteria can distinguish windows from other rectangular VEs: not being contained in a larger rectangle (other than the displayed background); being larger than a threshold size; having a characteristic border width, top banner, menu bar, or handles for opening, closing, and resizing. Several criteria can be applied in the alternative if no one criterion necessarily applies to all possible windows. Window symbolic entities (SEs) corresponding to windows 351, 352 will be added to the SOM-I. In some embodiments, the SEs may retain associations to their stored constituent geometric shapes or geometric borders. Debugging, disambiguating, and regenerating original images are some of the processes that may make use of the retained associations.

Figure 3E:
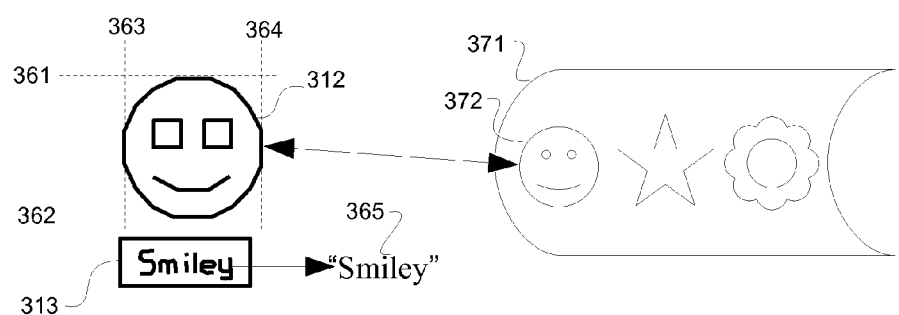

In FIG. 3E, the icon with detected perimeter 312 is given a minimum untilted rectangular bounding box defined by y-coordinates 361 and 362, and x-coordinates 363 and 364. Text from label 313 is recognized and extracted as plain text (e.g. ASCII or Unicode) 365. The bounding box, text, and image are placed in the SOM-I. In the illustrated embodiment, the icon with detected perimeter 312 is compared to contents of a stored image library 371 associated with the SOM, and flagged with an identifier if a close match 372 is found. In other embodiments, windows and other SEs, chosen from a finite set of SE types, are derived from the VEs (see, e.g. Appendix section 1) based on their extracted characteristics, without reference to an image library. In the selective-processing embodiments described in a later section, the original VE 302, or a compressed version, or associated textual metadata is matched to entries in the image library. In many embodiments, this type of processing is limited to a subset of VE types, usually those with a complex or individualized appearance such as icons.

In some embodiments, if no close match to icon 302 were found, a copy of the unmatched icon would be given an identifier and stored in the image library in case of being encountered again. The image-library copy could include the label text and other textual meta-data, or not. In some embodiments, both the image and the textual metadata are present but may be searched for independently. The comparison and identification may alternatively be done with raw pixel images of the visual entities rather than vectorized versions. In other embodiments, some widgets are processed differently from others; those will be discussed in later sections.

Through this process, the bulky raw pixel data of the displayed image is broken up into visual entities (e.g., windows and icons), and the visual entities are further reduced to symbolic entities that are sets of variables in a programmatic expression, e.g. UniqueID={EntityType; BoundingBox (Xmin, Xmax, Ymin, Ymax); ForegroundY/N; "LabelText;" MatchingImageID}. These highly compact symbolic entities can be manipulated more quickly even than vector images, and much more quickly than pixel-based images.

Visual entities displayed on a device screen are connected (at the underlying programmatic level) by relationships and hierarchies. Actions on one VE (and thereby on the underlying program) can also affect one or more other VEs in the displayed image. For example, opening a "Control Panel" or "System Preferences" window and clicking the "Display" or "Desktop & Screen Saver" icon inside the resulting open window allows access to an interface for changing the desktop background. The SOM-I keeps track of relationships and hierarchies of the SEs corresponding to displayed VEs. Each time a VE in a displayed image changes, the corresponding SE in the SOM-I reflects that change.

Figure 4A:
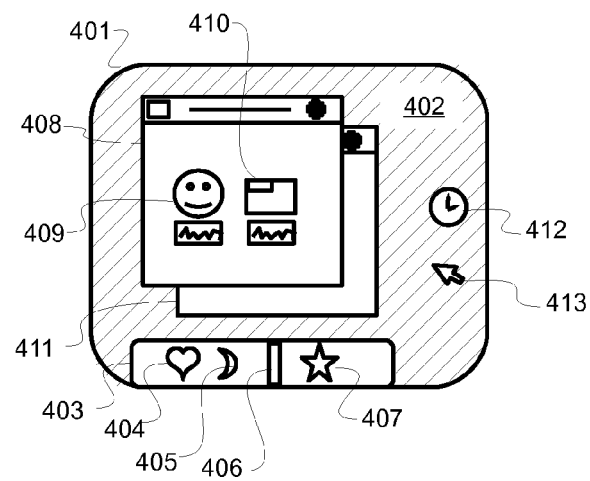
FIGS. 4A-B illustrate a displayed desktop image and a "tree" representation of the corresponding SOM instance.
Figure 4B:
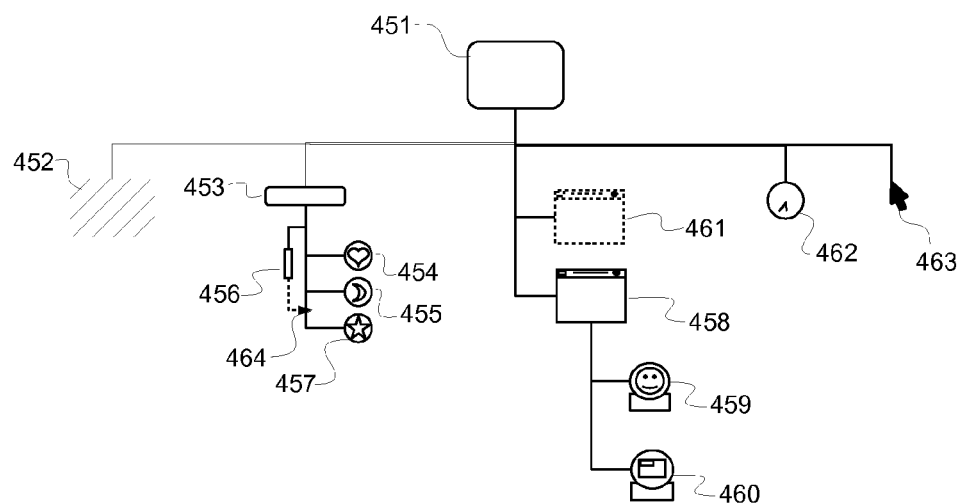

FIGS. 4A-B illustrate a displayed desktop image and a "tree" representation of the corresponding SOM-I. Here, only one desktop VE 401 is displayed; its outline is represented as top-level desktop symbolic entity (SE) 451. "Wallpaper" VE 402 is represented as background SE 452. Taskbar or dock VE 403 is represented as a panel SE 453. Focus window VE 408 and partially-hidden window VE 411 are represented as window SEs 458 and 461. Desktop clock gadget 412 is represented as gadget SE 462. Cursor 413 is represented as cursor SE 463. Background SE 452, panel SE 453, window SEs 458 and 461, clock-gadget SE 462, and cursor SE 463 are directly subordinate to desktop SE 451 in this SOM-I because the corresponding visual entities 402, 403, 408, 411, 412, and 413 are not substructures of any structure smaller than desktop 401.

Panel 403 contains panel icons 404, 405, and 407. Taskbar/dock divider 406 separates the group of the heart 404 and crescent 405 icons from the star icon 407. In the SOM-I, divider 406 is represented as separator SE 456. Icons 404, 405 and 407 are represented as icon SEs 454, 455 and 457, respectively. Because divider 406 and panel icons 404, 405, and 407 are contained in panel 403, their corresponding SEs 456, 454, 455 and 457 are subordinate to panel SE 453. Separator SE 456's relationship to icon SEs 454, 455 and 457 can also be stored, illustrated in this diagram by position flag 464. Window 408 contains icons 409 and 410. Icons 409 and 410 are represented by icon SEs 459 and 460, subordinate to the corresponding window SE 458.

In some embodiments, position flag 464 shown schematically here may not be a distinct position-flag element of the SE data structure, but may be built into the SE or SOM-I in some other way. For instance, in some embodiments each SE has a stored position relative to a reference point on the desktop (e.g. via its bounding-box coordinates) and the position of the separator relative to other elements of the panel can be readily derived from there.

The SEs in the SOM-I are expressed as data structures. SOM-Is have been successfully rendered in general-purpose languages such as C and, as is sometimes advantageous for expressing a variety of data-manipulation functions, database languages such as SQLite. Stored attributes of an SE can include some of the corresponding visual entity's visual properties (position, size, shape, color, reference to an image-library entry); its relationships to other entities; its status (e.g. visible/hidden, active/inactive, has focus/does not have focus); and associated text (e.g. labels, hover-text) converted into a plain-text format such as ASCII or Unicode.

Commands act on the SEs in the current SOM-I. In various embodiments, scripts can be written to search for an SE or set of SEs in the SOM-I based on various criteria. Criteria can include SE type (e.g., "all open windows,"), location ("all SEs subordinate to the Preferences window SE"), other properties ("all SEs with label text that includes the word 'Save'), or a combination ("all icon SEs in the Taskbar panel SE"). These and other lookup functions are implemented in runtime by the IPD. Other commands can, for example, "expect" an SE to appear, disappear, or change within a predetermined time, extract text from an SE, and tag an SE for later processing. Script commands that result in target-input to the target device include, but are not limited to, moving a cursor to an identified SE, typing a text string, combinations of "keydowns" and "keyups" of identified keys, families of mouse-clicks (single, double, left, right), touches and multi-touches, and spoken commands. A non-limiting list of example commands can be found in the Appendix.

Step-by-Step Process Example

Figure 5:
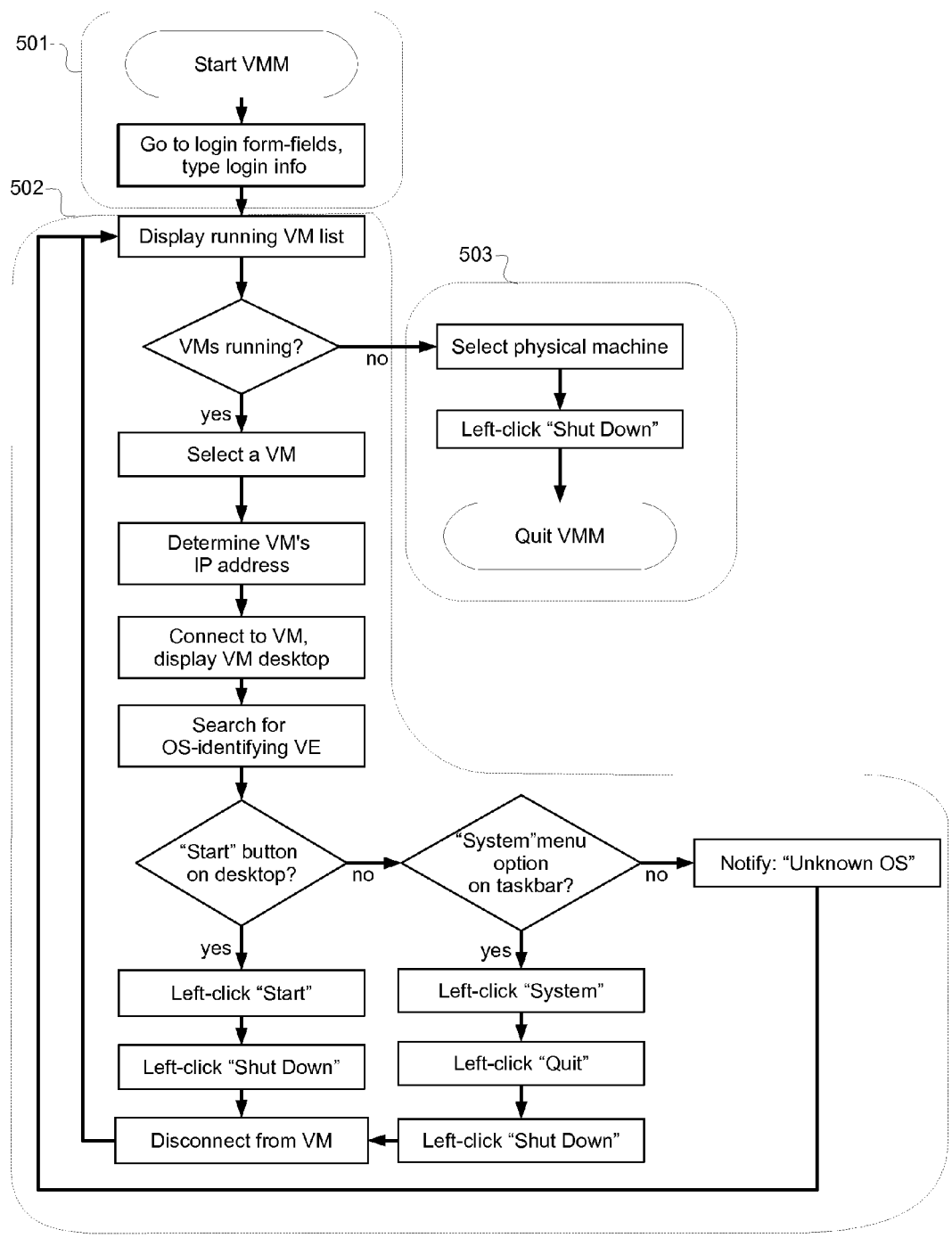
FIG. 5 is a flowchart of a scripted process example for a multi-OS environment.

FIG. 5 is a flowchart of an example process for remotely shutting down a computer that may be running at least one guest OS in a virtual machine (VM). This would be useful to, for example, a "cloud IT" provider renting time on servers. During times of overall low usage, energy could be saved and profits improved by shutting down the least-utilized servers after migrating their running applications to available capacity on more-utilized servers.

Before shutting down the physical server, the preferred practice is to shut down all its virtual machines first, using their internal mechanisms. This ensures that each guest OS's journals and logs are saved, and that no undesirable states are created by shutting down the VM in the midst of a write operation or communication with another device. A programmatic automated control script for this type of mixed-OS environment would be long, complex, and necessarily loaded with contingencies because of the variations in technologies and interfaces between one OS and another. A much simpler VSC script can handle the multi-OS scenario and be incorporated in the provider's provisioning framework. FIG. 5's process begins after the "least-utilized" servers have been identified and the applications migrated.

One approach to managing servers running virtual machines is use of a "virtual machine manager" (VMM) program. VMMs present a user-interface on a display, and therefore can be operated through VSC. In initial sequence 501, the script starts the VMM (e.g. by searching for its icon and double-clicking it) and logs in with a valid username and password. In various embodiments, the username and password may be in the script, or the script may include instructions to retrieve the username and password from stored data. Once the login is verified, the VMM displays a list of the VMs running on the server.

The script then performs loop 502 to shut down each VM. A VM is selected from the displayed list (e.g. by clicking or keystroke tabbing). Its IP address is determined (e.g. by recognizing it in list text, drop-down text, or hover-text if it is shown there; or by any other means a user would undertake to get the address from the VMM, such as by clicking the "Networking" tab on Citrix® XenCenter®). The script then connects to the VM (e.g. through VNC®) and displays the VM's desktop.

Each guest-OS type requires different shutdown steps, so the script determines the VM's OS. Once the VM desktop is visible, its OS can be determined by searching for OS-identifying widgets such as the Windows® "Start" button or the Ubuntu® Linux® "System" menu item on the taskbar. (In some embodiments, this step may not be necessary if the VMM's VM list expressly identifies each VM's OS. In that case, the script could search for text saying, e.g., "Windows" or "Linux" in the VM's listing on the VMM screen, before opening the VM desktop).

Once the guest OS is determined, the script executes the shutdown procedure for that particular OS. For example, in a Windows VM, the target-input may be "left-click 'Start button' on desktop/wait for dialog box to open/search for text 'Shut Down' in dialog box/left-click 'Shut Down' option in dialog box." In a Ubuntu Linux VM, the target-input may be "left-click 'System' menu item on taskbar/wait for drop-down menu to appear/search for text 'Quit' in drop-down menu/left-click 'Quit' in drop-down menu." Because the SOM-I has the entity-type and relationship information for each of the SEs, the script will not be misled by other text saying "start" or "system" that happens to be elsewhere on the screen.

If the sought-after VEs cannot be found, the script logs an error and notifies the user that the VM could not be shut down. In some embodiments, the script exits the loop immediately on an error. In others, the script attempts to shut down the other VMs and, if they could not all be shut down, exits the loop before shutting down the physical machine.

The system repeats loop 502 until no more VMs are running. Then, in final sequence 503, it selects the physical server (from, e.g., the XenCenter® tree view) and clicks "Shut Down," then quits the VMM.

FURTHER DETAILS OF ALTERNATE EMBODIMENTS

Target-Device Multiplicity and Variety

A single controlling device can run a VSC script on multiple target devices simultaneously. Some types of software (e.g. messaging applications, multi-player games, streaming-video libraries) have hidden weaknesses that only affect performance when the number of users, or the number of messages or transactions per unit time, becomes excessive. The logistics of testing for these "high-use failures" can be daunting. With VSC, a single controlling device can direct multiple target devices to generate increasing traffic in the application under test, and observe and log any errors that occur.

Figure 6:
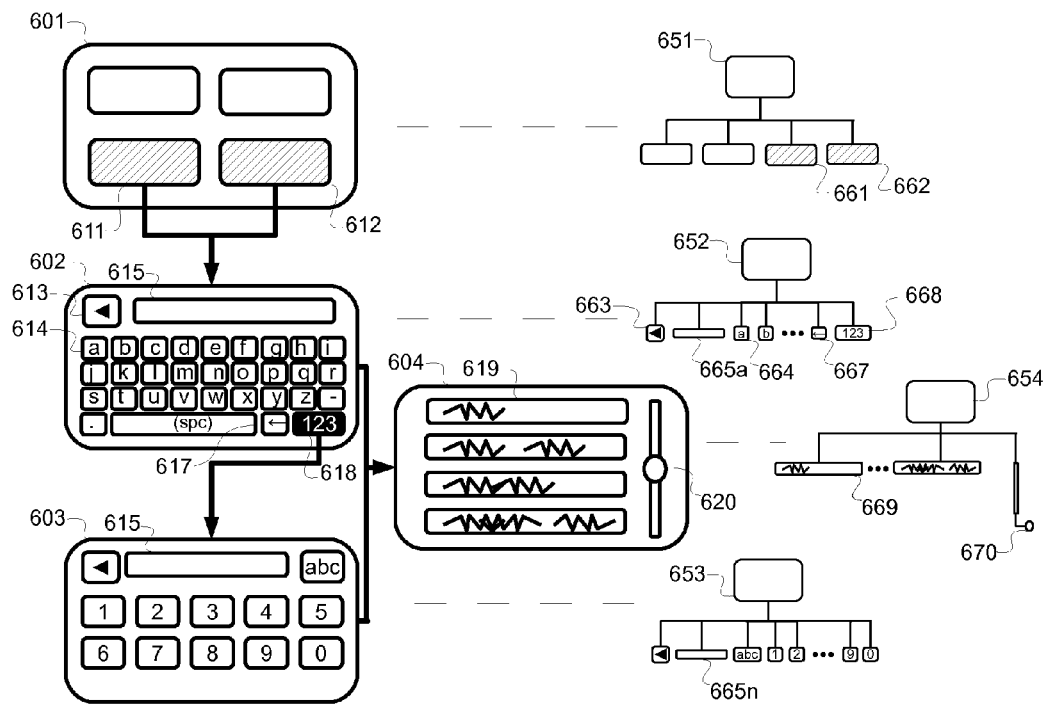
FIG. 6 is an example of a simple button control-board display, showing several screens and the corresponding SOM-Is.

Computers are not the only devices that can be controlled by VSC. FIG. 6 is an example of a simple button control-board display, showing several screens and the corresponding SEs in the SOM-I. When a human user uses the device, the buttons may be "pushed" by touching directly if the display is a touch-screen, or by buttons on the device, or by buttons on a remote control, or by speech commands. Interfaces like this are found in some vehicles, information kiosks in public venues such as airports and shopping malls, programmable appliances such as televisions and embroidery machines, and some phones and electronic readers. On these and other devices designed for one user task at a time, many selections produce a new full-screen "desktop" with a new set of visual entities. Here, the start-screen displayed image 601 has four menu buttons. In this example, if a command "pushes" (clicks, touches, or otherwise selects) bottom-left button SE 661 or bottom-right button SE 662 in SOM-I, start-screen displayed image 601 is completely replaced by alpha-keypad displayed image 602, just as if a user had pushed bottom-left button 611 or bottom-right button 612 on screen 601.

Alpha-keypad displayed image 602 is processed by the IPD and its VEs become the bases for SEs in the SOM-I subordinate to a new desktop SE 652 (some embodiments may alternatively treat displayed image 602 as a maximized window subordinate to initial desktop 601). From here, a VSC command could push back-button SE 663, corresponding to back-button 613, to return the device to start-menu screen 601. The script can also push any of the alpha-key SEs 664 generated from alpha-keys 614 to enter text in text-entry field 615. To erase text from text-entry field 615, a command could push delete-button 617 via its SE 667 (or, in some embodiments, use a specialized "clear entryfield" command as in the Appendix). As text is entered in or erased from text-entry field 615, the corresponding text in text-entry-field SE 665a is similarly changed when the SOM-I is refreshed.

Selecting the "123" button SE in SOM-I 652 produces numeric-keypad displayed image 603, and its SEs are added to SOM-I 653, subordinate to a new desktop (or window) SE 654. This type of keypad-switching is common on touch-screens where buttons need to be large enough for a human finger to touch just one key at a time (or on devices where the keys must be readable from some distance, as when using a remote control to select keys displayed on a TV screen across a room). On the screen, the text already typed into text-entry field 615 persists when the user switches keypads between alpha-keypad 602 and numeric keypad 603. In embodiments where the SOM-I only retains SEs for currently-visible VEs, text-entry-field SE 665*a* in the alpha-keypad desktop or window and its counterpart 665*n* in the numeric-keypad desktop or window may have no links with each other at all, but the text entries will remain correct due to being re-read. In embodiments that keep SEs in the SOM-I even when they are not being displayed, text-entry field SE instances 665*a* and 665*n* can be expressed as a single persistent SE.

While information is being entered in either of the keypads, the device's software may sense an information threshold and change the keypad's displayed image to an autocomplete-list displayed image 604, which is processed to create another new desktop (or window) SE 654. Autocomplete-list displayed image 604 has several visible options 619, along with a slider 620 that can hide visible options 619 to reveal other options. A VSC command can now select any of the visible-option SEs 669, or operate slider SE 670 to reveal other options. In embodiments where the SOM-I only retains SEs for currently-visible VEs, visible-option SEs 669 can be compared to a desired string, the matching SE 669 can be selected if visible, or slider 670 activated to reveal other options if there is no match. In embodiments that keep SEs in the SOM-I even when not visible, option SEs 669 can be collected for every position of slider 670 and compared with a desired string to find the closest match, in case none is a perfect match.

Software for many devices other than computers, such as smartphones and global positioning system (GPS) units, is often tested on simulators rather than the actual devices because interfacing with the actual devices is inconvenient. As long as a device has a display and some way to receive target-input, it can be tested via visual-symbolic control. One advantage of testing on the actual device is that conditions that affect device hardware, which in turn can affect software performance, can be realistically introduced into the test. Such conditions include variations in amount of memory, ambient temperature, humidity, communication signal strength, and electromagnetic interference.

Control of Virtual Desktops

Some embodiments can handle target devices that generate more than one displayed image. Different parts of a local desktop, for example, may be displayed on multiple monitors. Part of a virtual desktop may be visible on a local monitor while the rest is hidden until the hidden space is displayed. A desktop may be transmitted from a remote device and presented on a local monitor.

In many operating systems, a user can expand the virtual space of a computer's desktop environment beyond the physical dimensions of the screen, allocating sets of documents and applications to various regions of a larger virtual desktop. This allows the user to keep his or her place in multiple concurrent tasks without confusingly cluttering a single desktop. Different regions of enlarged virtual desktops can be accessed via a window, via a screen-switching icon, or moving the cursor to the edge of the current screen.

In multi-monitor systems, different regions of enlarged virtual desktops can be routed to different monitor screens. By contrast, in switching-KVM (keyboard-video-mouse) systems, a switch determines which of several devices displays its interface on a single monitor and responds to target-input of the associated keyboard and mouse.

Another type of virtual desktop is a guest-OS desktop, displayed when a device with one "host" OS is enabled to run a second "guest" OS via a virtual machine. A virtual machine can provide a complete system platform for running the guest OS without requiring extra hardware on the local device.

Figure 7:
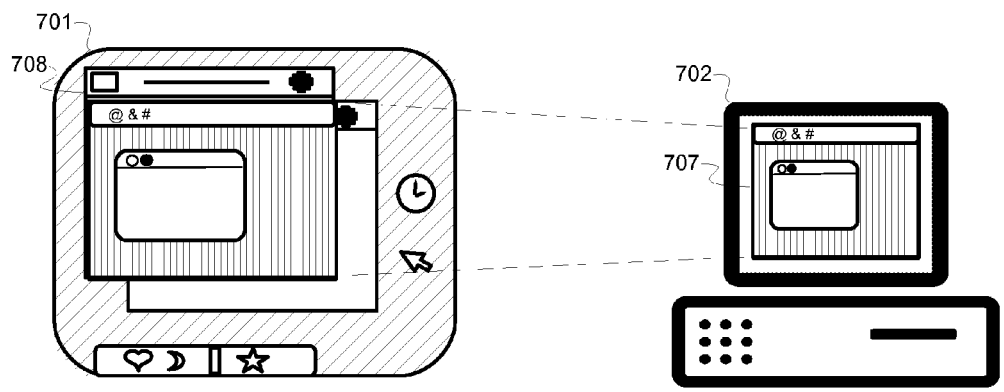
FIG. 7 illustrates an example of remote-desktop interaction.

Remote desktops are another type of virtual desktop; a program such as pcAnywhere®, Splashtop®, Microsoft's Remote Desktop Connection® or VNC® may enable one computer to access and manipulate a remote computer by displaying the desktop of that computer in a window or on a switchable screen. FIG. 7 is an example of a remote desktop display. Facilitated by a network connection and appropriate software, window 708 on local desktop 701 is displaying remote desktop 707 from remote device 702. If the software enables control of the VEs on remote desktop 707 by target-input to local desktop 701, then a VSC script addressing local desktop 701 as a target device can also "reach through" window 708 and operate remote device 702 as a target device.

Variations on Device Connection and Function Distribution

FIGS. 8A-D are conceptual illustrations of connections and process distribution in some alternative embodiments. These are intended as non-limiting examples.

Figure 8A:
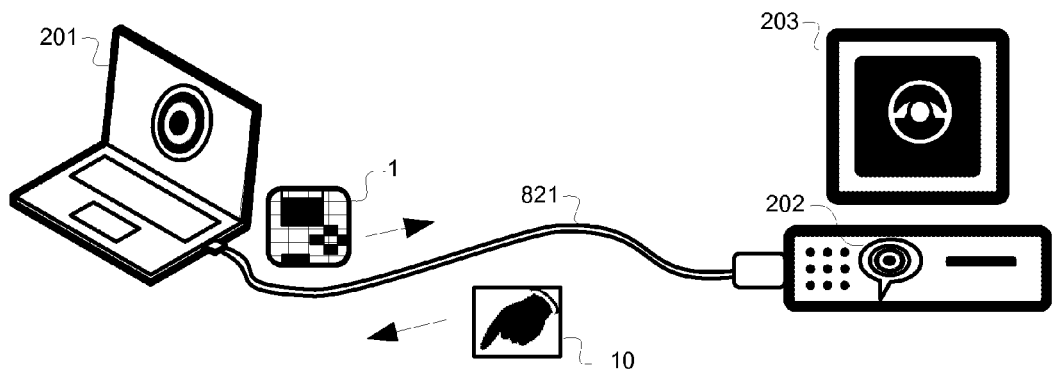
FIGS. 8A-D are conceptual illustrations of connections and process distribution in some alternative embodiments.

FIG. 8A shows a simple cable connection 821 between target device 201 and controlling device 203. If a target device has a video port or other wired or wireless access point for its displayed image 1, and also a port through which an auxiliary input device (e.g. a USB or Bluetooth keyboard or mouse) can enter target-input 10, then target-adaptor hardware and software 202 can reside wholly on controlling device 203, and nothing special needs to be added to target device 201 to enable VSC. Connection 821 may equivalently be multiple cables, a wireless link, or a combination thereof.

Figure 8B:
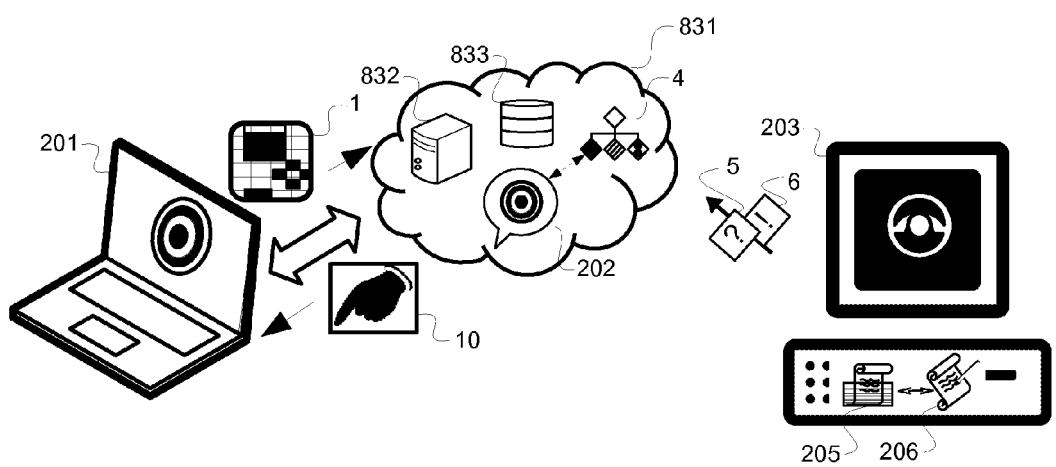

FIG. 8B shows an example of a distributed system, where target device 201 and controlling device 203 are connected (by any suitable means) to a distributed network represented by cloud 831. Distributed network 831 may include one or more servers 832 and one or more databases 833. In this example, target-adaptor function 202 takes place in distributed network 831, as does the image processing to generate SOM-I 4. In the illustrated embodiment, script interpreter (or compiler) 205 and script development environment 206 are located on controlling device. When a script runs, interpreter 205 interprets it and passes queries 5 and commands 6 to the IPD running on server 832. The IPD builds and updates SOM-I 4 and, handles queries 5 and commands 6. Similarly, target device 201 passes display-images 1 to the IPD and receives target-input 10 from the IPD. Databases 833 may include device and OS profiles, image libraries, mapping structures and other domain knowledge, and script libraries. Databases 833 may be on server 832 or they may be elsewhere, accessible to server 832 through the network.

The illustrated embodiment is not the most bandwidth-conservative, because entire display-images (in compressed or uncompressed form) are passed across the network every time the SOM-I is refreshed. However, it is one of the most flexible embodiments because the target device only needs some kind of suitable network connection and the controlling device only needs a way to send commands to, and receive data from, a network-based development environment or runtime. In other distributed embodiments, script interpreter (or compiler) 205 or script development environment 206 may reside on a server 832 in distributed network 831, e.g. they may be accessed via a Website on the server. Although the components of the VSC software can be distributed in a wide variety of ways on a network, including using the network as a passive conduit like cable 821 in FIG. 8A, distributed operation presents opportunities to greatly reduce the technical demands on controlling device 203.

Figure 8C:
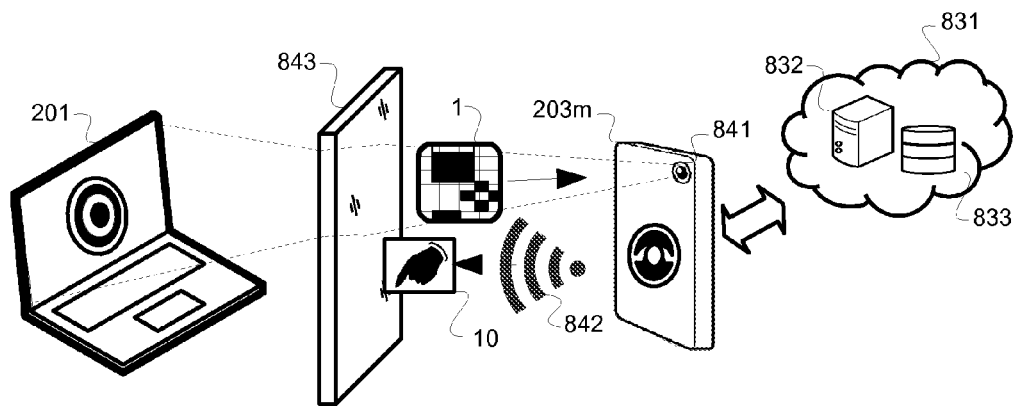

FIG. 8C, is an example of a non-contact connection with a mobile controlling device. Here, mobile controlling device 203m uses a camera 841 to capture display-images 1 from target device 201 by taking pictures of the screen, and a wireless connection 842 (e.g. Bluetooth, infrared) to transmit target-input 10 to target device 201. The runtime environment (including the IPD, image libraries, and script interpreter as well as any specialized hardware), the script editor, and the script development environment (which may include a script editor and a runtime environment) can be apportioned in any convenient way between controlling device 203m and server(s) 832 and database(s) 833 in distributed network 831. Some embodiments localize specialized hardware in the vicinity of either the controlling device or the target device. This approach can be advantageous when there is no convenient access to the framebuffer of target device 201, or when target device 201 is in an isolating enclosure but its display is visible from outside, as illustrated here through transparent pane 843.

Figure 8D:
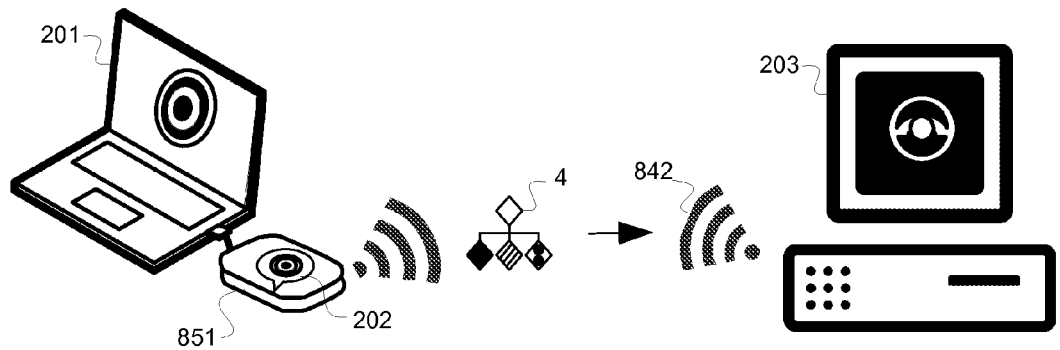

FIG. 8D is an example of a system with a target-adaptor module, a dedicated or semi-dedicated piece of hardware. Target-adaptor module 851 connects to one or more input/output ports in target device 201 and passes information back and forth to controlling device 203. In the embodiment shown, substantially all target-adaptor functions 202 (the image processing daemon generating SOM-I 4 from the displayed image of target device 201 and the functions converting commands into target-input) occur on target-adaptor module 851.

Here, scripts running on controlling device 203 interact with SOM-I 4 over wireless link 842; other embodiments could include wired links and a larger intervening network. This embodiment conserves bandwidth on link 842 by carrying out most of the complex processing close to target device 201. Other embodiments of target-adaptor modules might execute only part of the target-adaptor function 202, with the rest occurring on controlling device 203 or elsewhere on a network to which controlling device 203 and target-adaptor module 851 are connected. For example, target adaptor module 851 could periodically (or after a triggering event) receive a copy of the SOM-I and verify that it still accurately represents the current displayed image on the target device. If a mismatch is detected, target adaptor module 851 can re-transmit the current displayed image (or only those portions found to have changed).

Alternatively, target adaptor module 851 could be instructed to ignore changes in certain regions of the desktop (e.g., a background slide-show, a timer, or a console window where logging information is rapidly appearing or scrolling). The instructions describing types of display changes to ignore may be part of the script, stored settings called by the script, or resident in firmware or software in target adaptor module 851. Some embodiments could include a camera to capture the screen display and mechanical actuators to operate hardware keys, buttons, knobs, or sliders on devices without accessible input/output ports.

Selective Processing

Enhanced embodiments may use a variety of processing algorithms, each optimized for a specific VE type. For example, a text-processing algorithm might look for a collection of neighboring edge-pixel chains that are within a certain size range and aligned on a horizontal axis. The collection of chains can then be given a bounding box and sent to an OCR algorithm for further processing to extract the ASCII or Unicode text. A desktop-icon processing algorithm might look for edge-pixel chains of a certain size, with text labels positioned below them, arranged on the desktop in a grid pattern. A "button" extraction algorithm can look for a rectangle of a certain size and with rounded corners, and then determine whether the interior edge-pixel chains form a text label or an icon within the rectangle.

Icons and similar graphically-detailed VEs (MacOS® bookmarklets and other "mini-icons", some graphic buttons) can include some form of captured image in their SEs along with other attributes. However, there are some differences between VSC techniques that include an image in the SE and other approaches that match entities in the pixel domain rather than the symbolic domain.

The IPD can be programmed to recognize and select graphically-detailed VEs using a number of different criteria: size, position, (e.g. in a taskbar or dock), reactions to clicking or hovering by a cursor, geometric-border characteristics, similarity to images in libraries, and any other characteristic common to the selected VEs but uncommon among other VEs. Once recognized, the selected VEs can be subject to a different process than the other VEs. FIGS. 9A-E conceptually illustrate one embodiment of selective processing for icons.

Figure 9A:
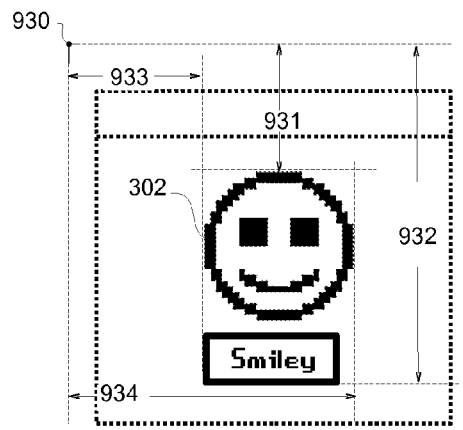
FIGS. 9A-E conceptually illustrate one embodiment of selective processing for icons.
Figure 9B:
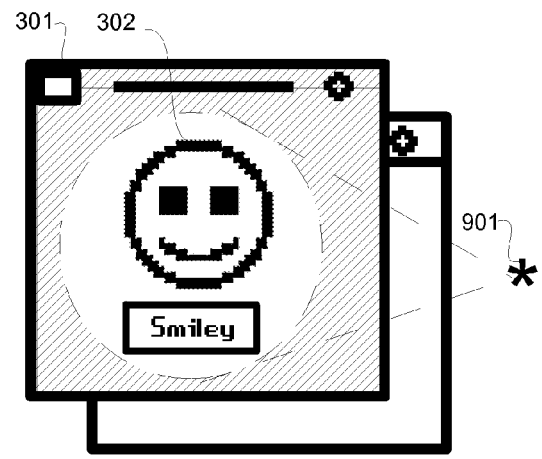
Figure 9C:
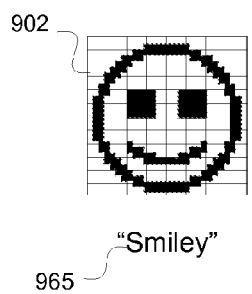

In FIG. 9A, the IPD determines the coordinates 931, 932, 933, 934 of the bounding box for icon 302 as presently displayed, relative to reference point 930 of the displayed image. In some embodiments, each character of the label text is also given its own bounding box (omitted from the illustration for legibility) prior to being routed to OCR. In FIG. 9B, the IPD recognizes "Smiley" icon 302 in window 301 as an icon by some recognition process 901. One possible recognition process 901 is based on the size of the bounding box and the characteristics of nearby VEs. If bounding box (931,932,933, 934) is a within a range of typical icon sizes, and the bounding boxes nearby and below are sized and arranged typically for text, Smiley 302 is classified as an icon. In FIG. 9C, icon image 902 is extracted. This may be an original image, a compressed image, or in some embodiments the binarized edges, extracted contours, or geometric borders. Label text 965 is extracted along with the image.

Figure 9D:
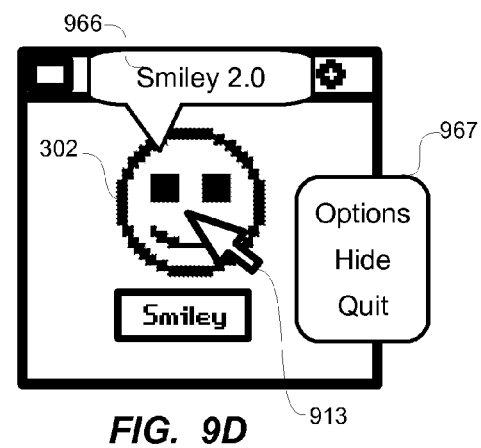

In FIG. 9D, the IPD optionally generates target-input to reveal the displayed icon 302's reactions, including appearance alterations and associated "revealable" text that can be added to the domain knowledge of the SOM. In the illustration, the IPD moved cursor 913 over icon 302, revealing hover-text 966, then entered a "right-click," revealing pop-up contextual menu 967.

In another embodiment, hidden-but-revealable text 966, 967 is not collected routinely during initial analysis; that process is deferred until a script includes a query or command identifying an icon by its revealable text. For example, if a script command requests a widget identified by its hover-text, the IPD hovers the cursor over each widget in the displayed image, revealing and extracting hover-text from each one, until the request is matched or until all the widgets in the displayed image have been hovered over. The IPD adds the extracted hover-text for each widget to the widget's SE in the SOM-I. The resulting SOM-I includes information on whether hover-text has been found for each widget, and if so, what it is. If a subsequent command requests another widget by hover-text, and the hover-text does not match any that is already cached in the SOM-I, the IPD need only extract hover-text from any widgets that were not previously hovered over.

Figure 9E:
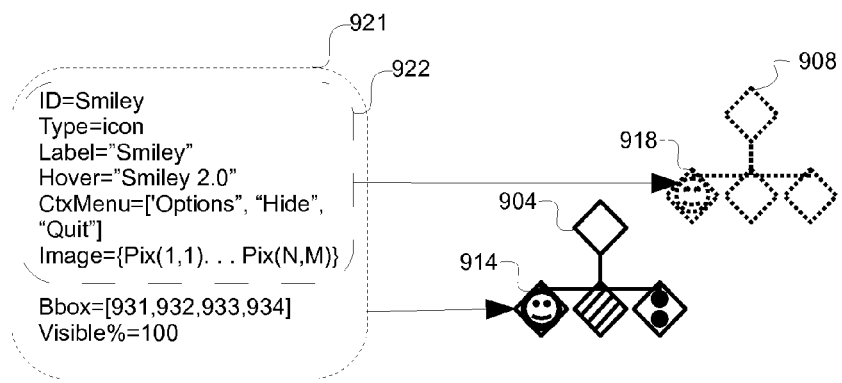

In FIG. 9E, captured information 921 about icon 302 goes into its SE 914 in SOM-I 904. The expression "Image={Pix (1,1) . . . Pix(N,M)}" represents the encoded form of captured icon image 902, which in this illustrated example is an array of N×M pixels. As well as the icon's graphic and textual content, the SOM-I needs the icon's context: the bounding box information "Bbox" that keeps track of the icon's position and size on this particular displayed image, and its visibility (as illustrated, 100% because no part of it is hidden behind another VE). Optionally, a core subset 922 of this information, comprising the information that could help identify this icon if the IPD encounters it again, is added to the associated domain knowledge, libraries, and mapping structures 918 in SOM 908. If the IPD is not equipped to add the metadata required for the mapping structure, core subset 922 can be preserved in a log or other file and the metadata can be added later.

Capturing and cataloguing a widget's image as part of a selective-processing algorithm provides another way to identify particular widgets in VSC scripts. Besides identifying them by textual metadata such as identifiers, labels, tags and the like, or by location relative to another VE or reactions to target-input, image-captured widgets can be identified by including their images directly in the script. The IPD responds by looking for a match for the scripted image among the images in the SOM-I. The images do increase the size of the SE data structure. However, the ability to recognize icons and similar graphically complex widgets quickly and accurately whenever they appear, and to retrieve the relevant domain knowledge from the SOM instead of needing to repeatedly "rediscover" what the icon is or does, improves efficiency and can produce a net increase in speed over groups of successive operations. Judicious selection of VE types for which to retain images is part of overall process optimization.

This differs from approaches that act on all VEs as images, without creating SEs or a SOM-I. Here, only selected (and generally small) parts of the displayed image, rather than the entire displayed image, are addressed by VSC queries and commands. Another difference is that because the SOM-I reflects the relationships and hierarchies of the SEs, a particular image-containing SE often only needs to be searched for in the SE's expected parent structure (e.g., a Control Panel window or a taskbar) rather than the entire SOM-I. This SE searched for under its parent structure is found just as quickly no matter where the parent structure's corresponding VE is located in the displayed image. When a target device's docks and taskbars can be anchored on any edge of a displayed image, and its windows can open in arbitrary locations, this can be especially helpful.

Learning Modes

Another advantage of VSC's user-like interaction with target devices is the ability to "learn" a new or changed application or system just as the (more empirically-inclined variety of) user would. The information acquired by learning is added to the domain knowledge of the SOM: its image and character libraries, mapping structures, and so forth. Both manual and automatic learning modes are possible.

Manual learning depends on explicit action by a VSC user. In one embodiment, the script development environment includes a "capture-and-catalog" tool. With the capture-and-catalog tool, a user accesses a displayed image and manually selects a new widget (e.g., an icon that starts a newly installed application). Optionally, the IPD may initially query the SOM to make sure the widget has not already been added. The tool enables the user to capture all the necessary attributes of an SE corresponding to the new widget. The process may include fitting a bounding box around the new widget; recognizing and storing text associated with the new widget (e.g. label, hover-text, contextual menu); assigning the new widget a name and type identifier; in selective-processing embodiments, storing the image if appropriate for the SE type; and cataloguing all the new widget's SE attributes in the SOM.

In another embodiment, a VSC user can capture and catalog a new widget by importing a file (screen-shot, other bitmap, other image type, set of image files). In some embodiments, the library can notify the user if an identical or substantially similar widget already exists in the library. In another aspect of manual training, software developers can catalog new widgets from their own products and contribute them to shared libraries. This generates publicity and goodwill for the developers among the user-base, and also removes the risk that a supplier's widget might be miscatalogued.

In one automatic learning mode, SEs corresponding to new widgets can be incorporated into the runtime during a training session, prior to running a script. In one embodiment, during the training session, the software compares all the SEs generated from VEs detected in the displayed image with stored information on known SEs. This might be done from the images, from the extracted lines, from associated text such as labels and hover-text, or from a combination. Any new widget (a VE not expressible by any known SE in the stored set) would be captured and catalogued: i.e., its attributes, which may include its image, would be placed in the library and given a name. Names can be arbitrary or based on associated text, and in some embodiments may be edited for easier recognition. For example, an automated training mode might find a new widget in a taskbar and place it in the image library, associated with its hover-text "Browse and run installed applications," assign it an auto-generated name such as "ABCD44," and notify the VSC user. The user, recognizing the image as the Ubuntu "Circle of Friends"® start button, could rename the new library entry "Ubuntu Circle of Friends." Now the user can write scripts to search for or act on this widget on any target device by identifying it in the script as "Ubuntu Circle of Friends." In another embodiment, a training session may simply populate an image library with all the found icon images and their associated metadata.

An alternative approach identifies new widgets "on the fly" while a script is running. The technique relies on knowing a target-input that will cause the widget to appear or disappear. Suppose a new version of an application places a mini-icon in a taskbar when the application is running. The script would cause the IPD to (1) extract all the widgets from the taskbar without the application running and temporarily store them as "Set A," (2) start the application, (3) extract all the widgets from the taskbar again and temporarily store them as "Set B," (4) subtract Set A from Set B, and (5) identify the remaining widget(s) as belonging to the application just started. The identified widget could then be tagged with metadata to be used for future queries and commands in the same script. (Some embodiments might do a "double-check" in case something else appeared at the same time for an unrelated reason, e.g. a low-battery warning: quitting the application, collecting a "Set C" of taskbar widgets, and making sure Set C−Set A=null).

Consider the example process of FIG. 5. A learning process involving the VMM screens could streamline the script to go straight to information such as the IP address and OS of each virtual machine, without needing to hunt for it and build in contingencies in case the information is not readily found.

Device-Aware Enhancements

Although VSC enables many tasks to be performed device-agnostically—that is, with no "knowledge" of the operating system or communication protocol at the program level—some scripts can be made more efficient by recognizing the OS (or a running application, or a device type). For example, the process in FIG. 5 began by searching the SOM-I for a "Start" button in the bottom left corner of the desktop (indicating a Microsoft Windows® OS) or a "System" menu item on the taskbar (indicating a Ubuntu Linux® OS). Once the OS is recognized, the process can be tailored for faster or more accurate performance on that OS. For example, a script for Windows XP® would only look for the in-focus application's main menu bar at the top of the in-focus window, while one for Mac OS X®, would only look for it in the panel at the top of the desktop. The process could also filter the image libraries it uses to look up icons (or, in some embodiments, other widgets); if the desktop is recognized as Ubuntu Linux®, the icon-matching process will consume less time if only Ubuntu Linux® icons are searched.

In some embodiments, the user may start a script with an OS-recognition process and then provide a branch point, where a subsequent process is chosen based on the OS recognition result. In tasks where the target-input to perform a particular action is particularly OS-dependent (for instance, "Ctrl+s" to save a file on Windows® vs. "Cmd+s" to save a file on Mac OS®), the correctly chosen branch could complete the task in less time than a completely agnostic script that tried every option for every possible OS.

In some embodiments, library entries corresponding to OS-identifying or device-identifying widgets can be built into a distributed product. Images, associated text and metadata, and other attributes for top-level "Start" buttons, window-manipulation handles, and access icons for system settings and preferences could be pre-catalogued and available to all scripts. Scripts could then call these frequently-used widgets by name or other shorthand identifier, accessing the device-identifying functionality from the scripted commands without needing to embed their images in the script.

Retention of Symbolic-Entity History

Embodiments of the SOM-I generating logic within the IPD can range from "forgetful" (re-creating the SOM-I each time the displayed image is analyzed) to "retentive" (keeping some kind of historical information about past states of the SOM-I or individual SEs within the SOM-I). Forgetful embodiments are simplest, but retentive embodiments add some useful capabilities.

Some embodiments overwrite the SOM-I only when something in the displayed image actually changes, rather than every time the framebuffer outputs a displayed image. This can reduce the bandwidth and processing time. The IPD can retain a stored displayed image, compare it to the current displayed image, and only overwrite the SOM-I (and store the current displayed image as the new comparison image) if the comparison detects a change.

Alternatively, the IPD can generate a new "candidate" SOM-I at intervals, compares the candidate SOM-I to the current SOM-I, and only overwrites the current SOM-I if the comparison detects a change. In one embodiment, the SOM-I takes "snapshots" of the displayed image periodically at a default frequency (every second, every 100 ms, or any other suitable interval). If mouse, keyboard, or other target-input activity is detected by the IPD, the snapshot interval is increased because the displayed image is more likely to change. The IPD compares consecutive (or otherwise subsequent) snapshots to look for differences. The changed areas, once identified, can be assigned bounding boxes or other types of boundaries. Feature extraction and other image analysis could then be confined to the assigned boundaries to account for the changes, rather than unnecessarily repeating those processes for unchanged parts of the displayed image.

In some embodiments, past copies of the SOM-I per se are not retained, but any VE that becomes visible at any point in a VSC task retains an SE in the SOM-I even while the VE is hidden. In one such embodiment, if a window opens during the script and hides some other widgets, those widget SEs are not removed from the SOM-I. Instead, they stay in the SOM-I and their visibility variables are changed to reflect their "hidden" status. Some SEs may be removed from the SOM-I under certain conditions. For example, a window SE may remain in the SOM-I with a visibility variable denoting whether it is fully visible, partially hidden, completely hidden, or minimized—but if the window is closed, the window SE is removed from the SOM-I. Some embodiments of the SOM keep track of the speed and direction of window movement.

Disambiguation

Another challenge frequently arising in machine analysis of displayed images in multitasking systems (where multiple windows or other application interfaces can be open simultaneously) is disambiguation. VEs that are programmatically independent can become juxtaposed in the displayed image to appear connected. Embodiments of the VSC IPD can resolve visual ambiguities from the results of disambiguating target-input, and sometimes successfully ignore them.

If the actions that juxtaposed the VEs (for instance, commands to open two overlapping windows) occurred earlier in the presently running VSC script, or in a previous period for which a log is available, the IPD will experience no ambiguity. As each event juxtaposing the VEs occurs (e.g. "Open Window 1," "Open Window 2"), the accurate SE relationships were captured ("Window 1 was opened from a desktop icon; its SE is subordinate to the desktop SE. Window 2 was also opened from a desktop icon; its SE is also subordinate to the desktop SE"). However, there may be situations where the history is not available. A target device may be in an arbitrary state when a script starts running. The SOM-I may become corrupted. Multiple applications (or multiple windows within an application) may open more rapidly than the SOM-I is being refreshed. Without access to the history that juxtaposed overlapping VEs, disambiguation may be needed before the IPD can sort out the relationships between the VEs and arrange the corresponding SEs in the SOM-I accordingly.

Figure 10A:
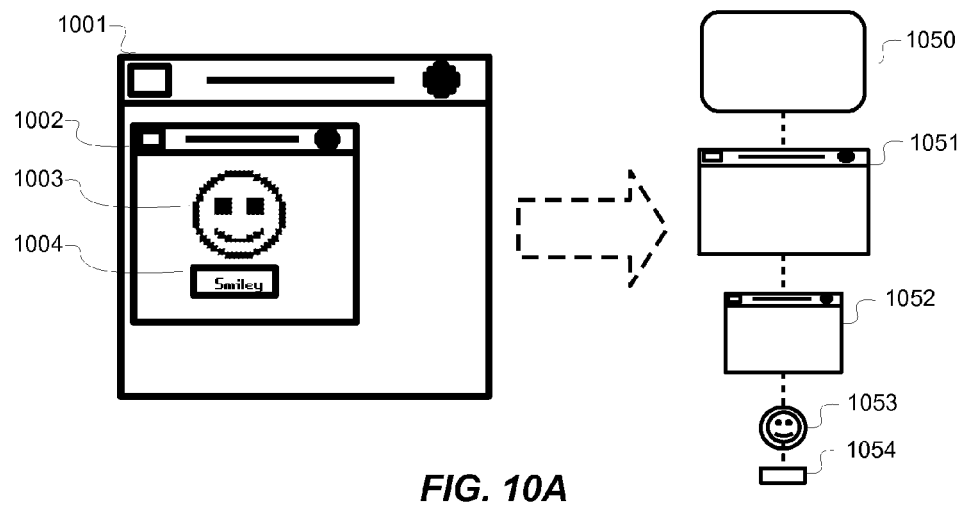
FIGS. 10A-B illustrate a disambiguation process.

FIG. 10A is an example of a displayed image with ambiguities and a corresponding default SOM-I created as an initial step in disambiguation. A small window 1002 appears wholly within the borders of a large window 1001. An icon graphic 1003 is near and above a text-containing rectangle 1004, and they are both wholly within the border of small window 1002. Without information about the previous actions that brought the displayed image to its present state, the system may not be able to discern the nature of some of the relationships:

(a) Is small window 1002 actually open inside large window 1001 (i.e., are they programmatically linked), rather than arbitrarily placed "on top" of large window 1001?

(b) Is text 1004 the label for icon graphic 1003, or a button associated with something else that just happens to be in a "label-like" position?

(c) Are large window 1001, small window 1002, and icon 1003 the interactive widgets they appear to be, or might any or all of them be a non-interactive picture (e.g. an illustration or screenshot visible in a document window)?

(d) In systems that support transparency, might large window 1001 even be in front of all the other VEs rather than behind it?

Embodiments of VSC begin by creating a tentative SOM-I based on assumptions. In some embodiments, the assumptions may be customizable for the known behaviors of a particular device or OS. In the illustrated example, the assumptions are:

(1) Any VE completely within a larger VE is subordinate to the larger VE, and (2) Any text near, below, and about the same size as an icon graphic is the icon's label.

Thus the illustrated tentative SOM-I has text SE 1054 subordinate to icon SE 1053, which is subordinate to small window SE 1052, which is subordinate to large window SE 1051, which is subordinate to desktop SE 1050.

An optional preliminary step, for systems supporting transparent VEs, is to open a global settings utility (e.g., Preferences or Control Panel) via target-input and ensure that transparency is disabled. This can reduce the number of ambiguities; if all VEs are opaque, any VE visible within the border of a window is either inside it or in front of it.

Figure 10B:
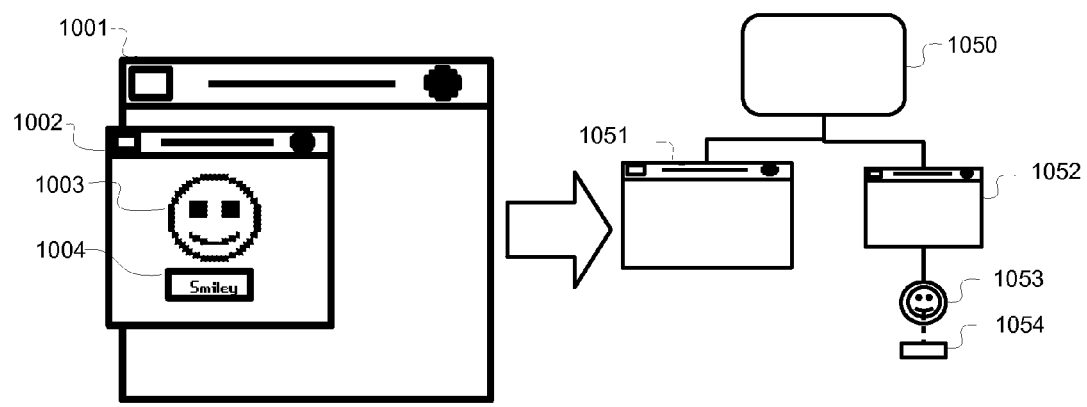

In FIG. 10B, the IPD generated a "Move" command (e.g. a mouse click-and-drag) to small-window SE 1052. Small window 1002 was able to move outside the border of large window 1001, which a subordinate window would not have been able to do. Therefore, the SOM-I is revised to make small window 1002 subordinate only to the desktop.

When small window 1002 was moved, icon graphic 1003 and text 1004 moved with it. Therefore, icon SE 1053 and text SE 1054 are subordinate, directly or indirectly, to small-window SE 1052. Their relationship between icon SE 1053 and text SE 1054 is still ambiguous, so for now the tentative assumption remains in place. A "Move" command to icon graphic 1003 could resolve the remaining ambiguity. If text 1004 moves with it, text 1004 is icon 1003's label and text SE 1054 is verified as directly subordinate to icon SE 1053. However, if text 1004 did not move with icon 1003, the next SOM-I revision would make text SE 1054 directly subordinate to small-window SE 1052.

Note that a "Move" command for disambiguation need not be as large in amplitude as the one in FIG. 10B. Even a shift of one pixel could allow the VSC software to ascertain which other visual entities moved the same amount as a result. A move that small, especially if reversed immediately after detecting the effects, would not be detected by a human viewing the screen.

Other target-input commands could alternatively have disambiguated the display of FIG. 10A:

(a) Selecting large-window SE 1051 to have focus (e.g., by clicking or Alt+Tab) would cause large window 1001 to appear empty. Small window 1002, icon graphic 1003, and text 1004 would disappear because they were not actually subordinate to large window 1001.

(b) A "CloseWindow" or "Minimize Window" command to large-window SE 1051 would have caused large window 1001 to disappear while small window 1002, icon graphic 1003, and text 1004 remained visible.

(c) Some windows will change a cursor's shape when the window is in focus and the cursor enters or exits the window; these can also be used for disambiguation.

Another assumption that can be used in disambiguation is that each application currently running on a target device contributes exactly one top-level window (and perhaps one or more subordinate windows) to the SOM-I.

(a) Target-input commands can check which applications are running (e.g., opening the Windows® Task Manager, looking for "spotlights" under icons in the Mac OS X® Dock, hovering the cursor over taskbar icons, and using a keyboard shortcut such as "Alt+Tab" or "Cmd+Tab" to change which application has focus until the first-found application returns).

(b) If the SOM-I has the wrong number of top-level windows, a "Show Desktop" or "Minimize All Windows" command can be executed, then one window at a time can be restored to its regular size.

Some applications provide a way to see a list of their open windows, e.g. in a "Window" drop-down menu, a contextual menu, or hover-text; the number of these open files is usually related to the number of subordinate SEs that should be under the application's top-level window in the SOM-I.

VSC can deal with other types of ambiguity. For example, the borders of windows can sometimes be difficult to detect against a background. One approach is to adjust the IPD's edge detection threshold, as described in an earlier section. Alternative approaches use target-input to resolve ambiguity:

(a) Where the background color is close to that of the window, a command to set the display to High Contrast can increase the difference in appearance and make the edge easier to detect.

(b) Where the background is patterned, a command to Show Desktop or Minimize All Windows will reveal which lines were actually window borders.

(c) In some operating systems, the cursor changes shape when it crosses a window boundary. In one of these systems, a command to move the cursor across the boundary of a suspected window, and analysis of the cursor's appearance before and after the crossing, can determine whether a rectangle is a window.

Another source of ambiguity arises when programmatically identical or analogous widgets can appear visually different ("polymorphous VEs" as discussed in an earlier section). Cursors may be the most polymorphous. Users can customize a cursor's default size, shape, color, and motion behavior (e.g. blinking, trails). Windows, their on-screen controls (e.g. sizing handles) and their contents (e.g., editable documents and drawings, games) can also change a proximate cursor's appearance. Other polymorphous VEs include icons for the same application or file-type (e.g., an icon that opens a folder or document) that present somewhat different appearances when installed under different operating systems.

One way to keep track of alternate appearances of a VE is by reference to stored data, such as an image library, which may be part of the SOM. Device-dependent or OS-dependent subgroups or tags may be included, to narrow the search range in device-aware or OS-aware scripts. Within a library, alternative appearances of the same widget could be organized as a set of images using an identifier (e.g. "cursor/blackarrow, cursor/whitearrow, cursor/hand, cursor/crosshair") and the SE could include a reference to this set identifier.

Figure 11:
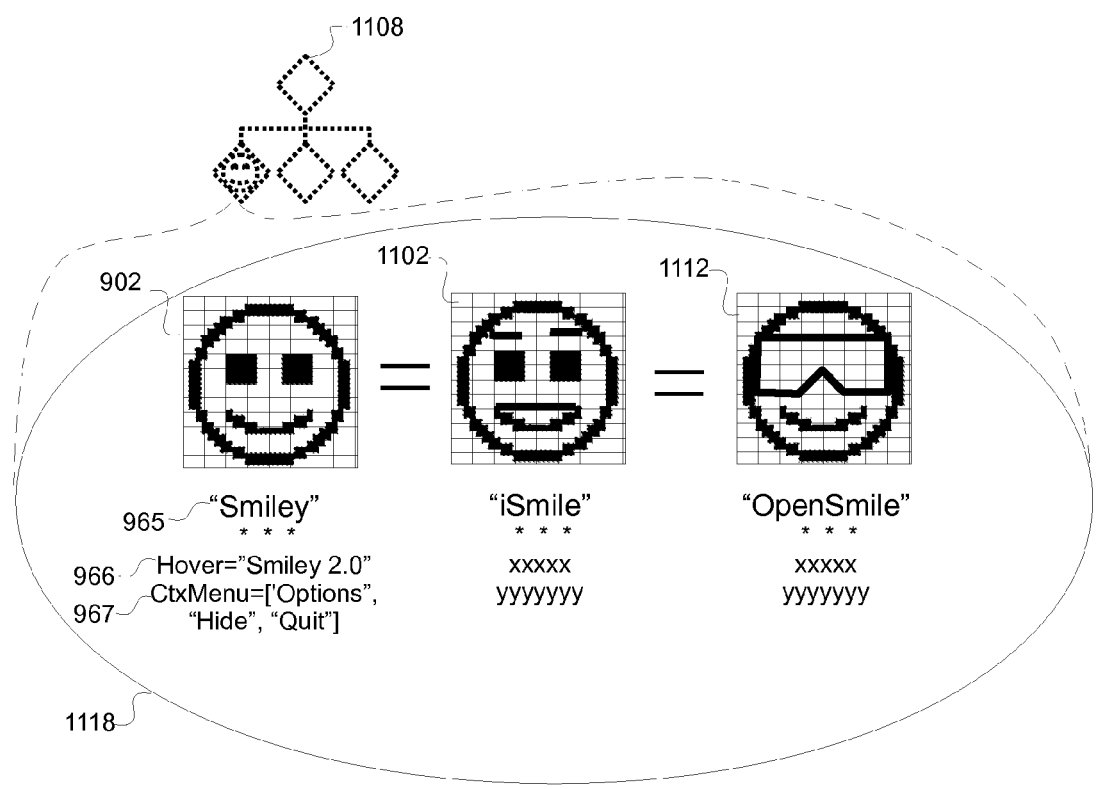
FIG. 11 illustrates a mapping data structure in the SOM.

In some embodiments for handling polymorphous VEs, the SOM includes a mapping data structure (MDS). The MDS links all the alternative appearances of the polymorphous VE with associated information useful for generating the corresponding SE if any version of the VE is detected in a displayed image. In some embodiments, all the alternative-appearance linking is done within the MDS. FIG. 11 conceptually illustrates an MDS 1118 as part of SOM 1108. The information can include (1) the set of possible versions of the VE 902, 1102, 1112 (as images or contours; as embedded data in the MDS or as references to an image library); associated text (e.g. label text 965, hover-text 966, contextual menu 967); the corresponding SE type (e.g. icon SE, cursor SE, caret SE). When the IPD recognizes any mapped version of a polymorphous VE, the MDS ensures that the correct corresponding SE is generated, and that an appearance change in the polymorphous VE triggers a change in the corresponding SE rather than the generation of a separate "new" SE. In various embodiments, the MDS for a particular SE may be built into a distributed product, or may be a result of an automatic or manual learning mode.

Programming Languages

The script development environment may include an API. In some embodiments, the VSC scripts can be written in a custom language. In other embodiments, the API structures the VSC commands as one or more language bindings to existing "base" programming languages. Examples of compatible base languages include Lua, TCL/Expect, Python, and C. The language-binding structure makes the interface accessible to multiple languages with no need to translate or revise the underlying material. One approach to language-binding is to implement VSC commands as a library function call where the function takes a string argument. The string argument may include familiar colloquial computer terms such as the verbs "select", "open", "type", "click", "right-click", "double-click" and the nouns "cursor", "mouse", "window", "menu", "dock", "title", "folder", "icon", "button", and "text entry field." Some sample commands embedded in Lua appear in the Appendix.

This specification and the accompanying drawings are intended to explain general concepts and offer specific examples, but not to limit the scope of legal protection for the subject matter. That protection is limited only by the scope of the claims.

I claim:

1. A method of controlling a target device, comprising:
   reading a position and a color of each of a plurality of pixels from a displayed image on the target device,
   recognizing, from analysis of the positions and colors, a first subset of the plurality of pixels as forming a first visual entity in the displayed image and a second subset of the plurality of pixels as forming a second visual entity in the displayed image,
   creating a first symbolic entity comprising attributes of the first visual entity expressed as coded text,
   creating a second symbolic entity comprising attributes of the second visual entity expressed as coded text,
   determining a relationship between a first software function represented by the first visual entity and a second software function represented by the second visual entity,
   organizing the first symbolic entity and the second symbolic entity into a symbolic object model instance comprising a link representing the relationship,
   selecting a search attribute,
   searching the symbolic object model instance for a matching symbolic entity having the search attribute,
   addressing a coded text command to the matching symbolic entity by interacting with the symbolic object model instance,
   translating the command into target-input, and
   transmitting the target-input to the target device,
   where the target-input simulates a human user's manipulation of an input tool to execute the command.

2. The method of claim 1, where the first visual entity comprises one of a desktop, a background, a window, an icon, text, a button, or a form-control, and
   the target-input comprises one of a keystroke, a mouse action, a touch, a gesture, or a speech command.

3. The method of claim 1, further comprising:
   transmitting a disambiguating target-input to cause a change in the displayed image, where the change depends on the relationship represented by the link,
   evaluating the actual change in the displayed image caused by the disambiguating target-input, and
   if the actual change reveals a different relationship from that represented by the link, revising the link.

4. The method of claim 1,
   where the attributes of the first visual entity in the first symbolic entity comprise a visibility variable, and further comprising
   changing the visibility variable of the first symbolic entity if the first visual entity becomes more or less visible in the displayed image.

5. The method of claim 1, where the first visual entity comprises a window, and further comprising
   determining whether the window has been closed, and
   removing a corresponding window-symbolic-entity from the symbolic object model instance upon a determination that the window has been closed.

6. The method of claim 1, where creating the first symbolic entity comprises matching a detected attribute with a stored attribute in a library, where the detected attribute comprises one of textual metadata and a graphic image.

7. The method of claim 6, where the detected attribute comprises a graphic image of the visual entity is of a selected entity type.

8. The method of claim 6, where
   the library comprises an identifying entry corresponding to a visual entity unique to a specific device or operating system,
   and further comprising, upon matching the detected attribute with the identifying entry, matching subsequently detected attributes with a part of the library associated with the specific device or operating system.

9. The method of claim 6, where
   the library is part of a symbolic object model, and
   the symbolic object model comprises a mapping data structure associating a single symbolic entity with alternative attributes of a plurality of alternative appearances of a polymorphous visual entity.

10. A non-transitory storage medium programmed with instructions and data comprising:
    data for a symbolic object model written in a coded text language,
    instructions for directly analyzing pixel positions and colors of a displayed image on a target device,
    instructions for recognizing a first visual entity and a second visual entity in the displayed image from the pixel positions and colors of parts of the displayed image,
    instructions for extracting an attribute of the first visual entity, an attribute of the second visual entity, and a functional relationship between a first software function represented by the first visual entity and a second software function represented by the second visual entity,
    instructions for creating a first symbolic entity in the coded text language comprising the attribute of the first visual entity,
    instructions for creating a second symbolic entity in the coded text language comprising the attribute of the second visual entity,
    instructions for organizing the first symbolic entity, the second symbolic entity, and a link representing the relationship into a symbolic object-model instance based on the symbolic model,
    instructions for selecting a search attribute and searching the symbolic object model instance for a matching symbolic entity having the search attribute,
    instructions for addressing a command to the matching symbolic entity by interacting with the symbolic object model instance, instructions for translating the command into target-input simulating a human user entering the command on an input tool for the target device and transmitting the command to the target device, and instructions for providing an application programming interface to incorporate the command into a stored script, where the coded text language of the symbolic entities and the symbolic object model instance is independent of a program generating the displayed image on the target device.

11. The non-transitory storage medium of claim 10, further comprising instructions for disambiguating the link by transmitting target-input to the target device, where the result of the target-input is dependent on the hierarchical or functional relationship, and revising the link if the result indicates that the link does not correctly represent the hierarchical or functional relationship.

12. The non-transitory storage medium of claim 10, further comprising data for a library comprising stored attributes of previously recognized visual entities.

13. The non-transitory storage medium of claim 12, further comprising instructions for adding the attributes of a new visual entity to the library.

14. The non-transitory storage medium of claim 12, where the symbolic object model comprises a mapping structure associating alternative appearances of a polymorphous visual entity.

15. A target adapter module, comprising:

a target-device connection configured to receive displayed-image information from, and transmit target-input to, a target device, an image processor configured to recognize visual entities in the displayed-image information and extract attributes of the visual entities, a controlling-device connection configured to receive commands from a controlling device, and a command processor, configured to translate the commands received from the controlling device into target-input to control the target device, where the displayed-image information comprises positions and colors of pixels;

where the image processor analyzes the positions and colors to recognize a first visual entity and a second visual entity, and where the command processor:

determines a relationship between a first software function represented by the first visual entity and a second software function represented by the second visual entity, expresses the first visual entity and the second visual entity as coded text symbolic entities, organizes the symbolic entities into a symbolic object model instance comprising a link representing the relationship, receives a selected search attribute, and searches the symbolic object model instance for a symbolic entity having the search attribute.

16. The target adapter module of claim 15, where the commands from the controlling device comprise queries to the symbolic object model instance.

* * * * *